United States Patent [19]

Hegelmann

[11] Patent Number: 4,901,399

[45] Date of Patent: Feb. 20, 1990

[54] APPARATUS FOR STRIPPING MEAT FROM THE EXTREMITIES OF POULTRY

[75] Inventor: Heinz-Dieter Hegelmann, Lübeck, Fed. Rep. of Germany

[73] Assignee: Nordischer Maschinenbau Rud. Baader GmbH & Co. Kg, Lubeck, Fed. Rep. of Germany

[21] Appl. No.: 287,836

[22] Filed: Dec. 21, 1988

[30] Foreign Application Priority Data

Dec. 22, 1987 [DE] Fed. Rep. of Germany ....... 3743541

[51] Int. Cl.$^4$ ............................................. A22C 17/04
[52] U.S. Cl. ......................................... 17/1 G; 17/11; 17/46
[58] Field of Search ...................... 17/1 G, 46, 11, 21, 17/52, 56

[56] References Cited

U.S. PATENT DOCUMENTS

| | | | |
|---|---|---|---|
| 4,068,350 | 1/1978 | Van Appledorn | 17/1 G |
| 4,327,463 | 5/1982 | Martin | 17/1 G |
| 4,446,600 | 5/1984 | Hooley et al. | 17/1 G |
| 4,488,332 | 12/1984 | Atteck et al. | 17/46 |
| 4,495,675 | 1/1985 | Hill et al. | 17/1 G |

*Primary Examiner*—Willis Little
*Attorney, Agent, or Firm*—Thomas R. Morrison

[57] ABSTRACT

This apparatus makes use of a first supporting disk driven in rotary manner about a vertical axis and having at least one stripping tool, which is constructed as a tubular body from two half-shells with a projecting end cutter and surrounds the bone of, for example, a poultry leg in the vicinity of the distal joint head or condyle. This first supporting disk is faced by a second supporting disk intersecting in inclined manner the axis of the first disk and rotating synchronously therewith and substantially comprising depressions facing the stripping tools arranged on the underside facing the first supporting disk for the shape-adapted supporting of the leg in the vicinity of the proximal condyle. The meat is stripped as a result of a supporting disk rotation angle of 180° approximation of the depression supporting the proximal condyle with respect to the stripping tool.

20 Claims, 2 Drawing Sheets

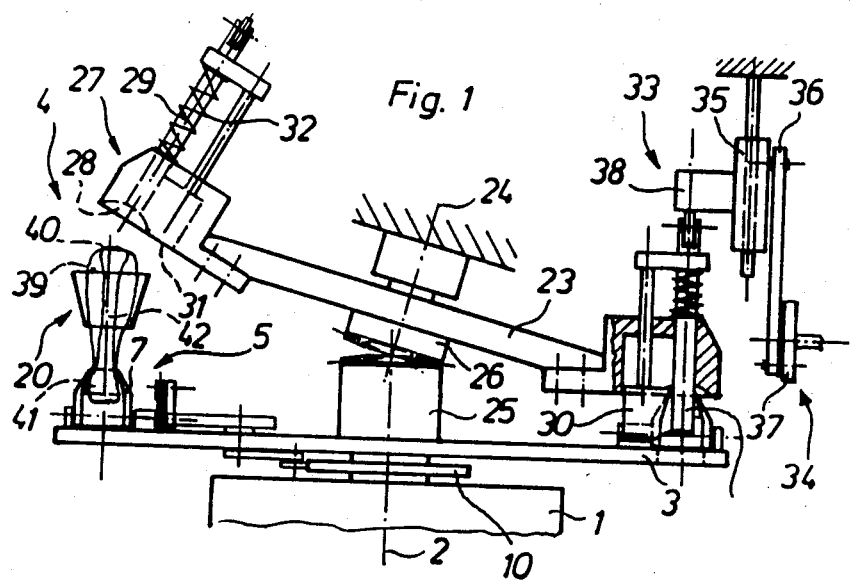
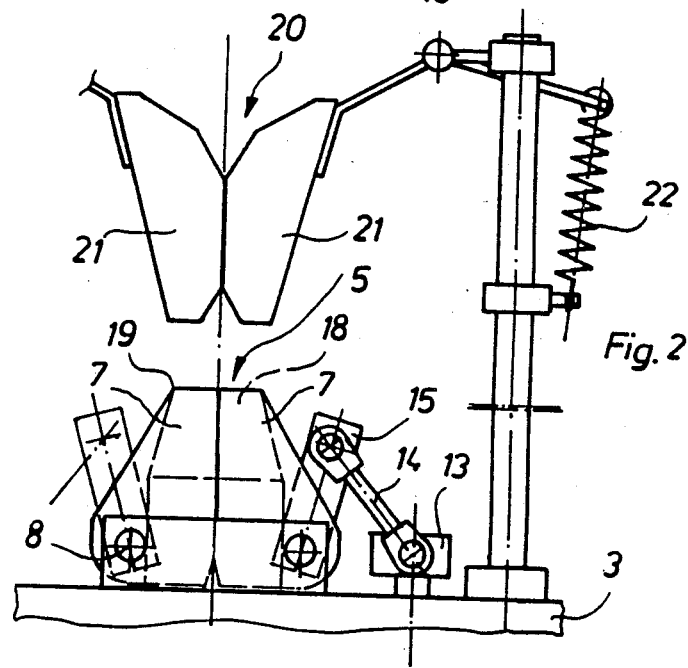

APPARATUS FOR STRIPPING MEAT FROM THE EXTREMITIES OF POULTRY

BACKGROUND OF THE INVENTION

1. Field of the Invention

The invention relates to an apparatus for stripping meat from the exremities of poultry, particularly from leg parts such as thighs, drumsticks or the like, which comprise a bone at least partially surrounded by meat, of turkeys or chickens, the apparatus comprising means for axially advancing the leg part to be processed, whilst engaging the bone in a centring manner in the vicinity of the proximal joint, as well as means for retaining the meat during the advancing, whilst radially embracing the bone.

2. Prior Art

From U.S. Pat. No. 3,672,000 there is known a machine for the automatic deboning of poultry thighs, in which the thigh bone is seized by one of its joint heads or condyles located at its ends by a holding member and the meat is stripped by means of scraping blades applied directly behind said holding member whilst moving the same in the longitudinal direction of the bone.

From U.S. Pat. No. 4,041,572 there is known an apparatus operating in a similar manner. The final operation in the case of said apparatus is the separation of the sinews and tissue parts still securing the meat following the stripping from the condyle at the free end of the thigh bone.

Finally, an apparatus can be taken from U.S. Pat. No. 4,446,600 in which the thigh bone is slid out.

3. Objects of the Invention

The main object of the present invention is to improve the last-mentiondd apparatus by reducing mechanical expenditure and increasing efficiency.

SUMMARY OF THE INVENTION

In an apparatus comprising means for advancing the leg part to be processed, whilst engaging the bone in a centring manner in the vicinity of the proximal joint, as well as means for retaining the meat during the advancing, whilst radially embracing the bone, this object is achieved, according to the invention, in that a first supporting disk driven to rotate about a substantially vertical first axis and a second supporting disk rotating synchronously with the first supporting disk about an axis intersecting in inclined manner the first axis are provided; that the means for retaining the meat are attached to the first supporting disk and comprise at least one stripping tool having a tubular body of at least two segments and initially embracing the thigh bone in the vicinity of its distal condyle, the tubular body being designed at its projecting leading or front edge as a circular cutting edge and being oriented substantially perpendicular to the rotary plane of the first supporting disk; that above the stripping tool there is arranged a receptacle also associated with the first supporting disk and adapted to receive, in a centring manner with respect to the stripping tool, the leg part to be processed; and that the means for axially displacing the leg part are associated with the second supporting disk and essentially comprise depressions arranged on the underside facing the first supporting disk and opposite to the stripping tools, which depressions support the leg part in the vicinity of the proximal condyle in a shape-adapted manner.

The advantages of this apparatus are in particular the approximation of these elements resulting solely from the synchronous rotation of the first and second supporting disks, i.e. in the derivation of the pushing out force acting on the condyle from said process. Thus, in this way, free and correspondingly sensitive piston rods are not required.

Advantageously, the segments of the tubular body of the stripping tool are designed to be spread relative to each other counter to the spring-tension and centrosynchronously, the corresponding control taking place by means of a stationary central cam. In order, on the one hand, to minimize the forces occurring due to the deformation of the stripped meat parts and, on the other hand, to ensure that the stripping of the meat takes place in the immediate vicinity of the bone surface, the tubular body has a truncated cone-shaped configuration at least in the area following onto the circular cutter and surrounds a cavity of similar configuration.

In the case of a stripping tool, whose tubular body comprises two segments, the plane of partition of the tubular body may be extended radially to the first supporting disk and the two segments thereof may be spreadable in nose or beak-like manner. Feeding of the apparatus is simplified in that the receptacle may comprise at least two guide flaps forming a funnel or hopper, which flaps can be forced apart counter to the spring-tension, respectively. In order to be able to completely discharge or eject the leg or thigh bone which has already been pushed through, it is possible to provide in each depression a discharging ram, which is appropriately arranged in a central opening in each depression supporting the proximal condyle, a front face of said ram forming part of the depression wall. A particularly reliable guide of the proximal condyle is obtained if each depression is shaped like a cup or a hollow cone and the face of each discharging ram is designed correspondingly. The discharging ram has an orientation such that its axis, observed at the point of maximum approximation between the first and second supporting disks, is aligned with the axis of the tubular body of the corresponding stripping tool.

The advancing of the discharging ram can be brought about by power-operated means arranged in the region of the greatest approximation of the first and second supporting disks and which may comprise a crank gear including a crank slide, which, each time a working unit arrives, undergoes a single-revolution activation and thereby is operatively connected with the free end of the corresponding discharging ram in order to operate the latter. In order to be able to remove the stripped meat sleeve or envelope in unimpeded manner, it is possible to provide a device for the one-sided splitting thereof, which can be brought about in that with each discharging ram is associated a separating member having a front cutting edge extending radially from its periphery, which cutting edge substantially extending from the plane of the front face of the discharging ram is shaped in accordance with the contour of the depression and the depression-surrounding underface of the second supporting disk.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings FIG. 1 shows a partial side view of the overall apparatus, FIG. 2 shows a side view of a stripping tool with a thigh receptacle arranged above the same, FIG. 3 a partially detailed plan view of the stripping tool with partial representation of the control mechanism for its segments.

DETAILED DESCRIPTION OF THE PREFERRED EMBODIMENTS

Figure 3:
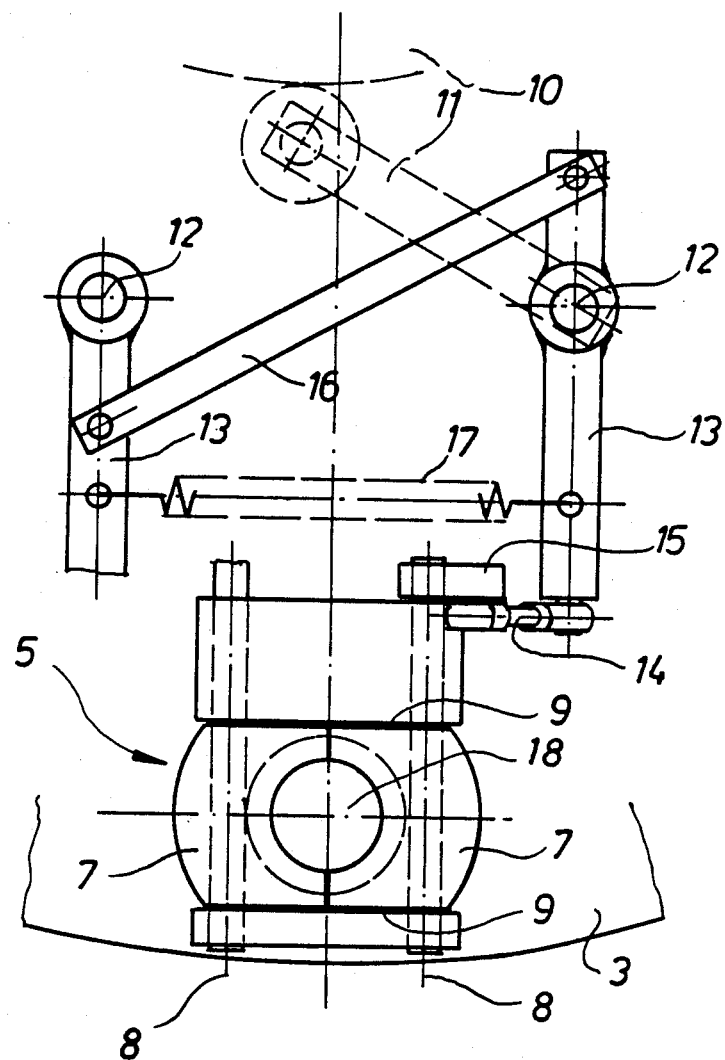

From a machine frame 1, which is not represented in detail but only intimated, there projects a first axle or spindle 2 driven in an appropriate rotary manner and onto which is attached in rotation secured manner, i.e. fixed to rotate therewith, a first supporting disk 3. It carries in the proximity of its outer circumference, for example, six working stations 4 arranged with an equal spacing. Each of them comprises a stripping tool 5 constituted by two half-shell-like segments 7 forming a tubular body and which can be pivotably spread apart in beak-like manner about axes or pins 8 extending approximately radially to the first supporting disk 3 and parallel to its rotary plane. The tubular body formed from the segments 7 has the configuration of a truncated cone, which is provided on opposite sides with flattened portions 9 arranged parallel to each other and extending perpendicularly to the plane of partition of segment 7. The beak-like spreading of the segments 7 takes place by means of a control mechanism not shown in FIG. 3. The latter comprises a roller follower or lever 11 supported on a frame-fixed central cam 10 and which is connected by means of an axis or spindle 12 penetrating the supporting disk 3 in rotation-secured manner to a rocking lever 13. On the free end of this lever engages a rod 14, which transmits the movement of the rocking lever 13 to the free end of a crank lever 15 connected in rotation-secured manner with the spindle 8 of one of the segments 7 and therefore converts the deflection or displacement of the roller follower 11 caused by the central cam 10 into a pivoting movement of the coupled segment 7. The construction of the control mechanism for the other segments 7 corresponds to that described with respect to the rocking lever 13, guide rod 14 and roller follower 15 as well as their interconnection. The pivoting movement of said segment 7 is however tapped by means of a synchronization rod 16 from the movement of the first-described mechanism, so that the two segments 7 can perform an oppositely synchronous pivoting movement. The closing position is produced by a spring 17 connecting the two rocking levers 13. As stated, segments 7 form a tubular body in the form of a truncated cone and surround a cavity 18 also having a truncated cone-like configuration, the upper termination being constructed as a circular cutter 19. Above each stripping tool 5 is located a receptacle 20 for the leg part or thigh to be processed. According to FIG. 2 it comprises two guide flaps 21 forming a funnel or hopper and which are arranged so that they can be forced apart counter to the tension of a spring 22.

Above the first supporting disk 3 is located a second supporting disk 23. This is mounted so as to rotate about a second axle or spindle 24 which is inclined thus to intersect the first axle 2 and is driven through the coupling of the two supporting disks 3, 23 by means of the bevel gears 25, 26. The second supporting disk 23 carries on its outer circumference structural units or standard components 27 cooperating with the stripping tools 5. Each of the same is provided on its underside facing the supporting disk 3 with a depression 28 shaped like a cup or a hollow cone, each of which faces a stripping tool. The centre of the depression 28 is formed by the front or end face of a discharging ram 29, which projects out of the structural unit 27 rearwardly and carries at said end a cam roller. The axis of the discharging ram 29 is oriented in such a way that it is aligned with that of the stripping tool 5 at the point of maximum approximation between the supporting disks 3 and 23. With the discharging ram 29 is coupled a severing member 30 with a front cutting edge 31, which has a configuration following the contour of the depression 28 and the underface of the supporting disk 23 surrounding the depression and terminates with said faces in the withdrawal position of the discharging ram 29. The withdrawal position is brought about by a spring 32. In the region of maximum approximation between the two supporting disks 3 and 23 power-operated means 33 for the advancing of the discharging ram 29 and the splitting member 30 are provided. These means 33 comprise a crank gear 34 including a crank slide 35, which is connected by means of a crank rod 36 to a crank disk 37. Crank slide 35 is provided with a cam piece 38, which can come into operative connection with the cam roller of the discharging ram 29.

The operation of the apparatus is as follows. A leg part, thigh or drumstick 39 to be deboned is placed in the receptacle 20 with the long axis of its substantially oval cross-section tangential to the rotary direction of the first supporting disk 3 and with the proximal condyle 40 uwwards, the distal condyle 41 projecting into the stripping tool 5 opened in the charging or loading region, i.e. into the space between the segments 7 thereof. As a result of the continuous rotation of the supporting disks 3 and 23, the structural unit 27 approaches the initially exposed proximal end of thigh 39 and is then engaged thereon, the depression 28 bringing about a centring, so that the proximal condyle 40 engages against the front face of the discharging ram 29. In the meantime, the segments 7 of the stripping tool 5 have been brought into the closed position, so that their front cutting edge 31 radially embraces the thigh bone 42. With increasing approximation of supporting disks 3 and 23, the thigh bone 42 progressively passes into the stripping tool 5, the frontal cutting edge 19 bringing about a retaining and scraping-off of the meat and the guide flaps 21 of receptacle 20 are displaced. Shortly before the proximal condyle 40 reaches the frontal cutting edge 19, the segments are at least partly moved apart. This position represents the point of greatest approximation of supporting disks 3 and 23, so that the proximal condyle 40 has immerged into the stripping tool 5. The stripped-off meat is now located around the stripping tool 5 in the form of a meat sleeve and is still connected by sinews and ligaments to the thigh bone 42. In order to complete separation, the crank drive 34 is activated so that the discharging ram 29 is advanced and the thigh bone 42 is discharged. The slitting member 30 simultaneously moved against the supporting disk 3 opens the meat sleeve, so that the stripped meat can be removed easily.

What is claimed is:

1. An apparatus for stripping meat from the extremities of poultry, particularly from leg parts such as thighs or drumsticks, which comprise a bone at least partially surrounded by meat, of turkeys or chickens, said apparatus comprising
   (a) a first supporting disk driven to rotate about a substantially vertical first axis and defining a rotary plane;
   (b) a second supporting disk rotating synchronously with said first supporting disk about a second axis intersecting in inclined manner said first axis;
   (c) means for axially advancing said leg part to be processed, whilst engaging said bone in a centring manner in the vicinity of its proximal joint, which means are associated with said second supporting disk and essentially comprise at least one depression arranged on the underside facing said first supporting disk, which depression supports said leg part in the vicinity of its proximal condyle in a shape-adapted manner;
   (d) means for retaining said meat during said advancing action, whilst radially embracing said bone, which meat retaining means are attached to said first supporting disk and comprise at least one stripping tool opposite to said at least one depression, respectively, having a tubular body of at least two segments, and initially embracing said bone in the vicinity of its distal condyle, said tubular body being designed at its projecting front edge as a circular cutting edge and being oriented substantially perpendicular to said rotary plane of said first supporting disk; and
   (e) a receptacle also associated with said first supporting disk and adapted to receive in a centring manner with respect to said stripping tool said leg part to be processed, which receptacle is arranged above said stripping tool.

2. An apparatus as claimed in claim 1, wherein said segments of said tubular body are designed to be spread relative and centrosynchronously to one another against spring-tension, and said apparatus comprises a stationary central cam for performing the corresponding control for said spreading.

3. An apparatus as claimed in claim 2, wherein, at least in the area following onto said circular cutting edge, said tubular body has a truncated cone-shaped configuration and surrounds a cavity of similar configuration.

4. An apparatus as claimed in claim 1, wherein said tubular body of said stripping tool comprises two segments, a thus produced plane of partition of said tubular body extending radially to said first supporting disk and the two segments being adapted to be spread apart in beak-like manner.

5. An apparatus as claimed in claim 2, wherein said tubular body of said stripping tool comprises two segments, a thus produced plane of partition of said tubular body extending radially to said first supporting disk and the two segments being adapted to be spread apart in beak-like manner.

6. An apparatus as claimed in claim 3, wherein said tubular body of said stripping tool comprises two segments, a thus produced plane of partition of said tubular body extending radially to said first supporting disk and the two segments being adapted to be spread apart in beak-like manner.

7. An apparatus as claimed in claim 1, wherein said receptacle comprises at least two guide flaps forming a hopper and which can be forced apart counter to spring-tension, respectively.

8. An apparatus as claimed in claim 1, wherein each depression has a central opening, and a discharging ram is provided, whose front face forms part of the wall of said depression and which fills said central opening.

9. An apparatus as claimed in claim 1, wherein each depression is shaped like one of a cup and a hollow cone and wherein a front face of each discharging ram is designed correspondingly.

10. An apparatus as claimed in claim 8, wherein each depression is shaped like one of a cup and a hollow cone and wherein a front face of each discharging ram is designed correspondingly.

11. An apparatus as claimed in claim 4, wherein said discharging ram has an orientation such that, observed at the point of greatest approximation between said first supporting disk and said second supporting disk, its axis is aligned with the axis of said tubular body of said corresponding stripping tool.

12. An apparatus as claimed in claim 8, wherein said discharging ram has an orientation such that, observed at the point of greatest approximation between said first supporting disk and said second supporting disk, its axis is aligned with the axis of said tubular body of said corresponding stripping tool.

13. An apparatus as claimed in claim 9, wherein said discharging ram has an orientation such that, observed at the point of greatest approximation between said first supporting disk and said second supporting disk, its axis is aligned with the axis of said tubular body of said corresponding stripping tool.

14. An apparatus as claimed in claim 1, wherein, in the region of the maximum approximation of said first supporting disk and said second supporting disk, power-operated means are provided for the advancing of said discharging ram against said corresponding stripping tool.

15. An apparatus as claimed in claim 14, wherein said power-operated means are constituted by a crank gear including a crank slide, which, each time a working unit arrives undergoes a single-revolution activation and thereby comes into operational contact with the free end of said corresponding discharging ram in order to operate the latter.

16. An apparatus as claimed in claim 8, wherein with each discharging ram there is associated a separating member having a front cutting edge extending radially from its periphery and which, starting substantially from the plane of the front face of said discharging ram is shaped in accordance with the contour of the depression and the depression-surrounding underface of said second supporting disk.

17. An apparatus as claimed in claim 9, wherein with each discharging ram there is associated a separating member having a front cutting edge extending radially from its periphery and which, starting substantially from the plane of the front face of said discharging ram is shaped in accordance with the contour of the depression and the depression-surrounding underface of said second supporting disk.

18. An apparatus as claimed in claim 11, wherein with each discharging ram there is associated a separating member having a front cutting edge extending radially from its periphery and which, starting substantially from the plane of the front face of said discharging ram is shaped in accordance with the contour of the depression and the depression-surrounding underface of said second supporting disk.

19. An apparatus as claimed in claim 14, wherein with each discharging ram there is associated a separating member having a front cutting edge extending radially from its periphery and which, starting substantially from the plane of the front face of said discharging ram is shaped in accordance with the contour of the depression and the depression-surrounding underface of said second supporting disk.

20. An apparatus as claimed in claim 15, wherein with each discharging ram there is associated a separating member having a front cutting edge extending ranially from its periphery and which, starting substantially from the plane of the front face of said discharging ram is shaped in accordance with the contour of the depression and the depression-surrounding underface of said second supporting disk.

* * * * *